VIDEO AMPLIFIER

Filed Sept. 7, 1962 2 Sheets-Sheet 1

FIG. I.

INVENTOR
Virgil A. Hinds

BY John R. Manning
ATTORNEY

April 26, 1966 V. A. HINDS 3,248,479

VIDEO AMPLIFIER

Filed Sept. 7, 1962 2 Sheets-Sheet 2

COLLECTOR OF T1

EMITTER OF T3

United States Patent Office 3,248,479
Patented Apr. 26, 1966

3,248,479
VIDEO AMPLIFIER

Virgil A. Hinds, Farmers Branch, Tex., assignor to Sperry Rand Corporation, New York, N.Y., a corporation of Delaware Filed Sept. 7, 1962, Ser. No. 222,059
7 Claims. (Cl. 178—7.1)

This invention relates to amplifiers and more specifically to a video amplifier for use in a character reading system.

Character reading systems are known which employ a plurality of different devices for scanning the characters and interpreting the characters so scanned. One such device employs a television camera tube such as an image orthicon or a vidicon. The purpose of the circuit of the present invention is to receive the video signals from the camera tube and to prepare the composite video waveform in such a manner that it will be in a condition for deriving the information contained in the waveform. When employed in the field of character scanning, it is most important to be able to establish a reference, so that light video, or light background information, can be easily distinguished from black information or character information. A sampling technique is employed and if the scanning beam samples a portion of the character, black information is generated. If the scanning means samples merely the background, the document upon which the character is formed, light or white information is derived.

In other words, the electrical current in the scanning beam of the camera tube is affected by whether the beam is swept over "dark" or "light" portions of the camera face (i.e., whether the portions are within the dark image of a character or in the lighter background or vice versa). Thus, a signal is developed which indicates the passage of the beam over portions of the character images.

The video signal thus derived from the scanning beam is then processed in the video amplifier of the present invention to obtain a more intelligible signal and from which the beam blanking or retrace signals have been removed. The signal derived from the circuit of the present invention is a composite signal containing a readily definable white or light reference level from which the black video or information may be readily determined. The signal thus obtained from the video amplifier of the present invention may be directed to a contrast control circuit and then to a Schmitt trigger from whence it emerges as a signal comprised of two voltage levels only. The contrast control circuit and the Schmitt trigger are not shown and do not form a part of this invention.

The rather unique principles upon which recognition of characters is based when using a camera tube in a character recognition system makes use of certain preselected stroke differences between the various characters to be read. Through a technique of spot sampling of the area in which the character occurs, any character can be recognized and distinguished from other characters by making use of the various distinctive characteristics borne by each character. Thus, by a proper selection of a pattern of sampling spots within the character area, characters may be distinguished one from the other by a comparison of "dark" or "white" condition of the video signal at the various sampling spots with known patterns of "dark" and "white" spots peculiar to each character.

The requirements which video frequency amplifiers must meet are often very rigorous. An important characteristic of the video amplifier of this invention is its ability to reproduce abrupt changes in wave shape. This is most important so that the "black" and "white" information can be derived from the signal waveform.

Briefly, the circuit accepts the composite video signals which are amplified at a first stage of amplification.

The signals are further amplified by a second stage of amplication. The output of the second stage of amplification is directed in parallel paths, one path to a most negative detector circuit and the other path to a third stage of amplification. The purpose of the most negative detector is to detect the most negative waveform on the composite video signal as the video is introduced into the circuit. The output of the most negative detector is coupled through a buffer stage and back to the input of the first stage amplification. The effect of this feedback is to subtract the waveform at the detector from the video introduced into the circuit so that, although the waveform assumes amplified proportions, the lower base or reference line of the waveform still has the same amplitude as when the video was introduced into the circuit but permitting, as pointed out, amplification of the video and blanking pulses due to the stages of video gain. A simple diode clamp is then utilized to "straighten out" the white signal base line of the composite signal and to improve the waveform. Means are then provided for removing the beam blanking pulses from the composite signal. The black information pulses are now readily distinguished from the white signal base line.

Accordingly, it is the principal object of the present invention to improve video amplifiers.

It is a further object of the present invention to improve video amplifiers utilized in a character recognition system.

It is a further object of the present invention to prepare the composite video waveform so that it will be in a condition easiest to derive the information contained in the waveform.

It is a still further object of the present invention to provide a circuit for establishing a reference so that "dark" information contained in a composite video waveform may be easily distinguished from "light" information.

Further features and objects of the invention will be found throughout the more detailed description and a better understanding of the invention will be afforded by the following detailed description considered in conjunction with the accompanying drawings in which.

Figure 1:
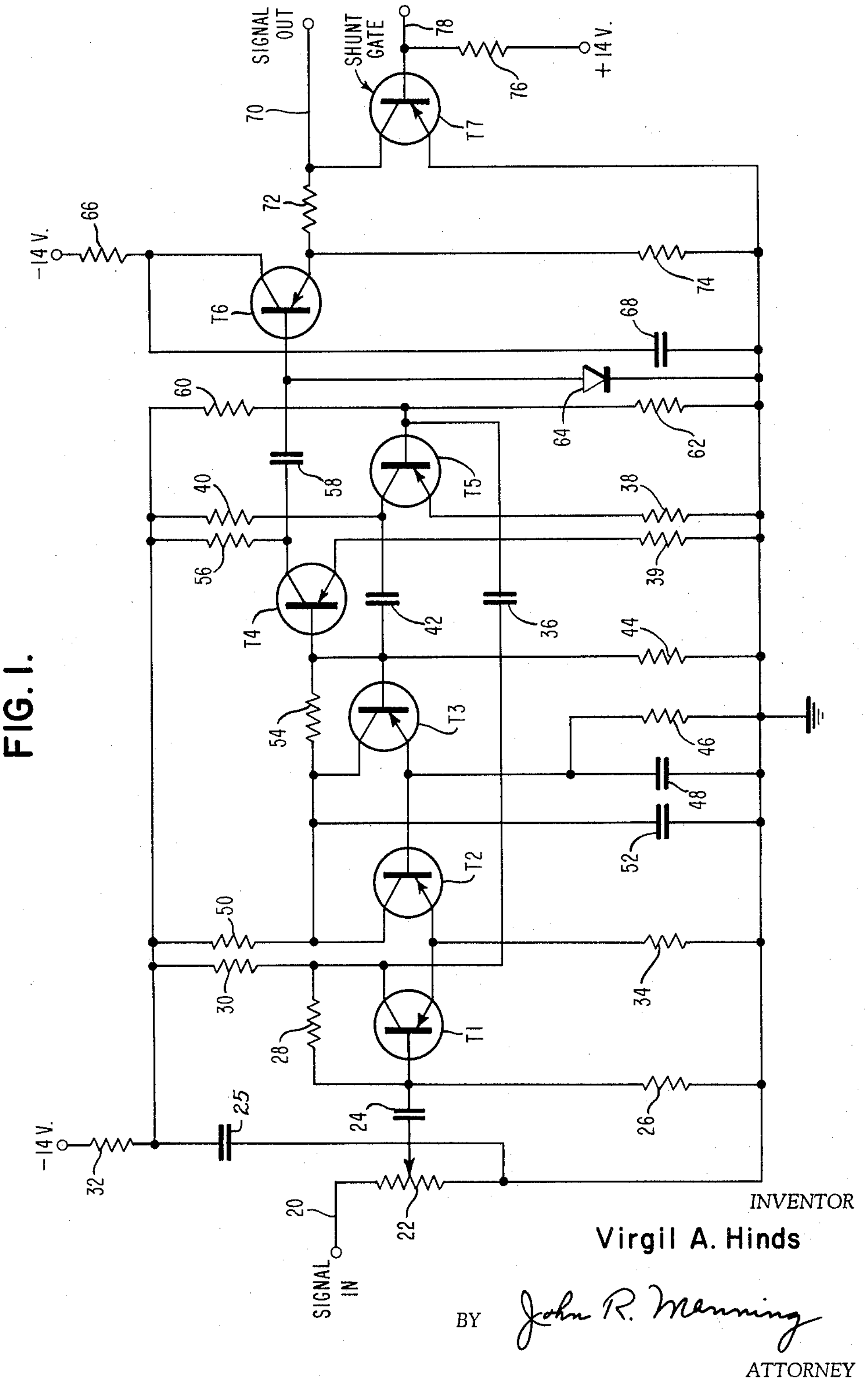
FIGURE 1 is a schematic circuit diagram of the present invention.
Figure 3:
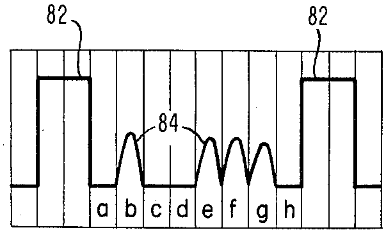
FIGURE 3 is a waveform showing the beam blanking pulses and the "dark" or information pulses.
Figure 4:
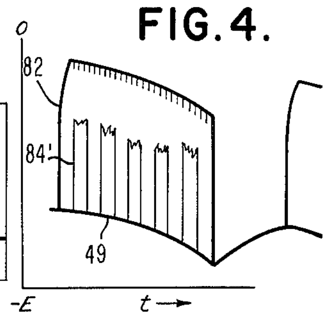
FIGURE 4 is a waveform of a composite video signal including the information pulses and the beam blanking pulses; and, FIGURES 5 through 8 show the waveforms at various points in the circuit of the FIGURE 1.

Signals having the waveforms such as shown in the FIGURE 4 are applied to the input conductor 20 of the circuit shown in FIGURE 1. This signal represents a plurality of signals shown in FIGURE 3. If a character is scanned ten times, then ten signals of the type shown in FIGURE 3 would be represented by the single waveform 84' plus its beam blanking pulses. It will be understood that the waveform of the FIGURE 4 discloses what one would see on the face of an oscilloscope as a composite signal and that it represents a highly "compressed" or composite signal. It would be very difficult, if not impossible, to show every trace of the beam on this figure. On a time scale, the FIGURE 4 may represent 300 to 400 times the elapsed time as that represented by the FIGURE 3. Accordingly, it will be understood that if each return of beam to its base level 49 were shown in the FIGURE 4, then the waveform of FIGURE 4 would be a solid figure and little would be gained from the disclosure. The "hairlike" lines extending from the top of the waveform of the FIGURE 4 denote that the beam blanking signal 82 reaches the highest level and reverses itself to return to the base level 49. Since the waveform 84' may represent ten scans of the same character, then 10 times 8 (sample spots *a* through *h*) or 80 signals or scans (a maximum but is almost always less) are represented in the waveform 84', each signal rising from the base level 49 to some level represented in the waveform 84'. The conductor 20 is connected to ground through a potentiometer 22. The setting of the potentiometer 22 will determine the level of operation of the circuit by the application of the input signal to the base of transistor T1 through a capacitor 24. The base of T1 is coupled to ground through a resistor 26. The collector of T1 is coupled back to its base electrode through a feedback resistor 28 and, in addition, the collector of T1 is connected to the −14 volt power supply through the resistor 30 and the low ohmic value resistor 32. A decoupling capacitor 25 is connected between resistor 32 and the grounded terminal of potentiometer 22. The transistors used in the present circuit are of the PNP type. It will be understood that if transistors of the NPN type were utilized, then the battery polarities would be reversed.

The emitters of the transistors T1 and T2 are coupled together and to ground through a resistor 34. The output of T1 on the collector is directed to the base of transistor of T5 through a capacitor 36. The emitter of transistor T5 is connected to ground through a resistor 38 and the collector of T5 is coupled to the negative voltage supply through a resistor 40. In addition, the collector T5 is connected to one terminal of capacitor 42 whose other terminal is coupled to both the base of the transistor T3 and the base of the transistor T4. A resistor 44 is connected from ground to the bases of T3 and T4. The emitter of T3 is connected to ground through the parallel connector resistor 46 and capacitor 48. In addition, the emitter of T3 is coupled to the base of the transistor T2. The collector of T2 is connected to the negative voltage supply through a resistor 50 and to ground through a capacitor 52. In addition, the collector of T2 is coupled to the collector of T3. The collectors of T2 and T3 are also coupled to the bases of T3 and T4 by a resistor 54. The collector of T4 is connected to the negative voltage supply through a resistor 56 and also to a capacitor 58. The emitter of T4 is coupled to ground through a resistor 39. The base of the transistor T5, which receives its input signal from the collector of T1 is connected to the negative voltage supply by a resistor 60 and to ground by a resistor 62.

The output of the transistor T4, on its collector, is coupled through a capacitor 58 to the base of the transistor T6. Coupled between the capacitor 58 and the base of the transistor T6, is a clamping diode 64 whose negative terminal is connected to ground. The collector of T6 is connected to the negative voltage supply by a resistor 66 and an A.-C. path is provided to ground by a capacitor 68.

Output signals are derived on a conductor 70 from the emitter-follower coupled transistor through a resistor 72 in series with the emitter of T6. In addition, the emitter of T6 is connected to ground through a resistor 74. Also connected to the output conductor 70 is the collector of the transistor T7 whose function is to remove the beam blanking pulses from the video signal. The emitter of the transistor T7 is connected directly to ground while the positive voltage supply is supplied to the base of T7 through a resistor 76. Signals applied to a shunt gate input 78, which is coupled to the base of T7, will cause the transistor T7 to saturate at the proper time so that the blanking pulses will be eliminated from the complete video signal.

Figure 2:
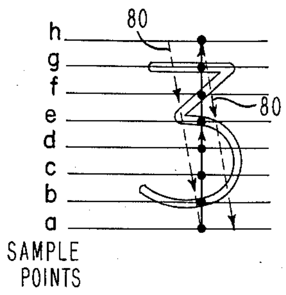
FIGURE 2 is an example of a scanning raster and the sample points of a character.

The FIGURE 2 shows one vertical scan of the camera beam across a character which may be positioned upon the face of the camera tube. The sample points are the points as shown, the points *a* through *h*. The retrace scans are shown by the lines 80. During the retrace of the beam, the beam is blanked and the resultant video is represented by the pulses 82, such as shown in the FIGURE 3. In an actual operating system, any number of scans of the character, vertical or horizontal, or both, may be utilized.

As shown by the FIGURE 2, it will be noted that sample points *b*, *e*, *f* and *g* intersect positions along the character and thus indicate "black" or "dark" sample points or "hits." These pulses are shown at 84 in the FIGURE 3. Since the sample points *a*, *c*, *d*, and *h* were on the background material, these would be termed "white" or "light" points and no signals would be produced at these positions as shown in the FIGURE 3. Thus, the waveform of FIGURE 3 represents the signal derived from one vertical scan and two retraces.

The composite video signal is shown in the FIGURE 4. For each horizontal scan of a character, there is generated a composite signal composed of the beam blanking pulse 82, envelope and one or more sample point information pulses shown at 84'.

The waveform of the FIGURE 4 is a composite video signal composed of the information pulses from the scanning of five characters of a field and the blanking pulses. The signal 84' represents a plurality of vertical scans of a single character.

The circuit of the present invention is fully transistorized and the particular embodiment shown utilizes PNP type transistors. The individual operation of the transistors are in accordance with the practices well known in the art wherein the emitter-base junction would be biased in the forward direction and the collector-base junction would be biased in the reverse direction. This is accomplished, as shown, by providing an arrangement wherein the emitter is positive with respect to its base, the collector is negative with respect to its base, and the emitter is positive with respect to its collector.

Signals such as the type shown in the FIGURE 4 are introduced on the conductor 20 of the FIGURE 1. The potential level of the input signal is determined by the setting of the potentiometer 22. The input signal is then applied to the base of T1 through the arm of the potentiometer 22 and through the capacitor 24. The transistor T1 conducts and the output signal of the collector of T1 is coupled to the base of T5 through a capacitor 36. A portion of the output signal is coupled back from the collector of T1 to its base through the resistor 28 to stabilize the operation of T1 in that if, for some reason, the conduction of T2 should change due to a shift of its operating point, T1 would remain in its proper operating region.

Figure 5:
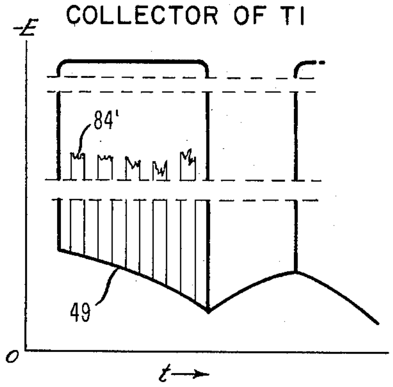

The transistor T1 operates as the first amplifier stage and the resultant signal on its collector is in phase reversal to the input signal. The waveform on the collector of T1 is affected by T2 and T3 and is shown at the FIGURE 5. It will be noted that the information and blanking signals have been amplified (as indicated by the broken lines in FIGURES 5–8) while the base or reference line 49 remained substantially constant (same amplitude as input signal). The base line 49 operates as the reference point from which "white" video is established. Thus, the greater the difference in amplitude between the "white" video reference line 49 and the "black" video pulses 84', the more effectively the black video can be discriminated from the "white" video. This is discussed later with reference to the stages T2 and T3.

The signal is further amplified by the transistor T5 and the output signal is taken from the collector of T5 and coupled through a capacitor 42. The signal now goes into two paths; a first path to the base of the transistor T3 and a second path to the base of the transistor T4. The signal at these bases of T3 and T4 is similar to that of the FIGURE 5 except amplified by another stage of gain. The position of the "white" base or reference line 49 remains substantially the same.

The transistor T3 operates as a most negative detector and its purpose is to detect the most negative waveform on the composite video as the video is introduced into the circuit. The capacitor 48 is charged "unilaterally" from the emitter of T3, and, as the signal is applied to the capacitor 48, the capacitor 48 charges to the most negative voltage applied to the base of T3. The capacitor 48, which is in parallel with a resistor 46 of large ohmic value, is prevented from rapidly discharging, and, thus, presents a signal waveform on the emitter of T3 such as shown at 49 of the FIGURE 6.

The capacitor 52 acts as a decoupler to provide an A.-C. path to ground for the collectors of T2 and T3.

Figure 6:
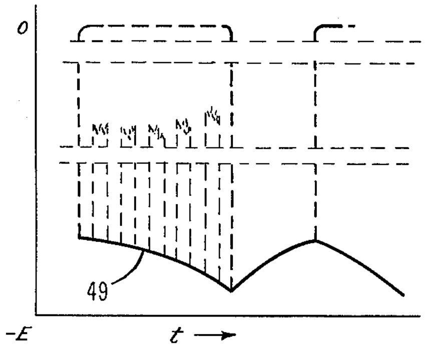
Figure 7:
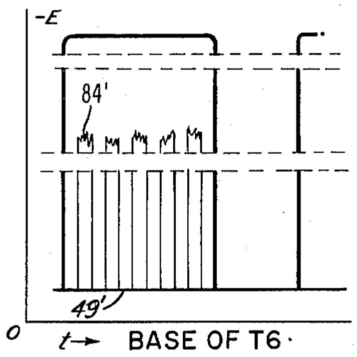

The output signal on the emitter of T3 and to the base of T2 is as shown in the FIGURE 6. The transistor T2 acts as a buffer stage for the network composed of the resistor 46 and the capacitor 48 by its high impedance to prevent loading of the time constant of the resistor 46 and the capacitors 48. Accordingly, the signal on the collectors of T2 and T3 are shunted to ground. The phase of the signal from the collector of T5 which was introduced to the base of the transistor T4 would be approximately 180 degrees out of phase with a signal appearing on the lefthand side of the resistor 54.

The circuit comprising the transistor T1, T2, T3 merit further discussion regarding the biasing of the emitter of T2 to place T2 in proper relation with T1. As T2 conducts and a voltage is developed across the resistor 50, it is fed back to bias T3 through the resistor 54 and to the base of T3 to affect the conduction of T3 and consequently the emitter current of T2. T2 serves another function in that the voltage developed on the emitter of T3 and the emitter of T2, is subtracted from the collector signal of T1 and is as shown at the FIGURE 5. The "white" video reference 49 has remained substantially constant while the "black" video has been amplified. This was accomplished by detecting the most negative waveform of T3 and feeding back through T2 to subtract the detected voltage from the composite signal which results in a non-amplification of the "white" video base or reference line 49.

The transistor T4 operates as another amplifying stage and its output on the collector of T4 is coupled through the capacitor 58 to the diode 64 and to the base of the transistor T6. The output signal on the base of the transistor T6 is shown in the FIGURE 7. The diode 64 is so poled as to clamp the signal at the base of T6 to substantially ground and thus establish a reference so that the "black" video can be more readily distinguished from the "white" video reference line 49 information. Thus, the signal assumes the more idealized waveform such as the waveform shown at the FIGURE 7.

The waveform appearing at the base of the transistor T6 is then directed to that transistor which operates as an emitter-follower and acts as a buffer stage for the clamping circuit comprising the diode 64. The output of transistor T6 on its emitter drives a resistor 72 which provides an impedance so that transistor T7, which is a shunt gate for removing the beam blanking pulses from the video signal, can short out the beam blanking signals on the conductor 70 side of the resistor 72.

Signals applied to the conductor 78 and to the base of the transistor T7 are in synchronism so that the beam blanking signal portion of the video signal is effectively eliminated from the composite video signal. Signals applied to the base of the transistor T7 will caues the transistor T7 to saturate and since its output is coupled from the collector of T7 to the conductor 70, the beam blanking signals are effectively removed from the signal output.

Figure 8:
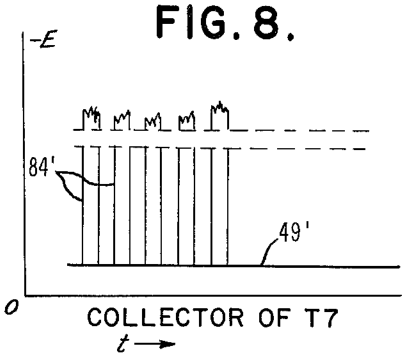

Thus, the signal appearing at the output terminal 70 is as shown in the FIGURE 8. The non-information blanking signals are removed and the base line, called "white" video, has been "straightened out" with a maximum amplitude of the "black" information video signals 84' from the "white" signal base line 49.

It will now be apparent, in accordance with my invention, there has been shown and described a video amplifier for use in a character recognition system employing a television-type camera tube. The circuit will prepare the composite video waveform so it will be in a condition wherein it will be easiest to derive the information contained in the waveform. That is to say, the circuit operates to establish constant reference so that the "dark" or character information can be more easily distinguished from the "light" background information. The composite video signal is introduced through two stages of amplification and then to a most negative detector circuit wherein a stage detects the most negative portion of the signal and directs its output back to the input signal to prevent amplification or distortion of the base or reference line while permitting amplification of the "black" video and blanking pulses. Another stage of amplification follows and a clamping arrangement is employed to establish a reference line or point and to improve the waveform. An emitter-follower circuit then drives an impedance so that a final transistor stage can be utilized as a gate for removing the beam blanking pulses. Thus, the output signal is an idealized waveform and containing only the desired "black" and "light" information, separated by a large amplitude.

The invention may be embodied in other specific forms without departing from the spirit and essential characteristics of my invention. The present embodiment is therefore to be considered in all respects as illustrative and the scope of the invention being indicated by the appended claims rather than the foregoing description, and all changes which come within the meaning and range of equivalency of the claims are therefore intended to be embraced therein.

What is claimed is:

1. A circuit for amplifying a video waveform having information signals and blanking signals formed from a varying reference level comprising a first amplifying stage having first and second transistors, said transistors having their emitters connected in common, a second amplifying stage coupled to receive the output from said first transistor of said first stage and a detector stage coupled between the output of said second stage and said second transistor of said first stage in a feedback arrangement wherein said detector stage detects the most negative portion of the waveform for subtraction from said first stage output to maintain the reference level of the waveform substantially constant as the input waveform.

2. The circuit as defined in claim 1 including means to bias the second transistor of said first stage through said detector stage.

3. A circiut for amplifying a video waveform having information signals and blanking signals formed from a varying reference level comprising a first amplifying stage having first and second transistors, said transistors having their emitters connected in common, a second amplifying stage coupled to receive the output from said first transistor of said first stage, a detector stage coupled between the output of said second stage and said second transistor of said first stage in a feedback arrangement wherein said detector stage detects the most negative portion of the waveform for subtraction from said first stage output to maintain the reference level of the waveform substantially constant as the input waveform, coupling means to bias the second transistor of said first stage through said detector stage, a third stage coupled to receive the output from said second stage and direct its output to an emitter follower stage, and clamping means coupled between said third stage and said emitter follower to clamp the varying reference level to a substantially non-varying level.

4. A circuit for amplifying a video waveform having black information signals and blanking signals formed from a varying white video reference level, comprising a first amplifying stage having first and second transistors, said transistors having their emitters connected in common, a second amplifying stage coupled to receive the output from said first transistor of said first stage, a detector stage coupled between the output of said second stage and said second transistor of said first stage in a feedback arrangement wherein said detector stage detects the most negative white video reference level portion of the waveform for subtraction from said first stage output to maintain the reference level of the waveform substantially constant as the input waveform while amplifying the other portions of the signal, and a third stage coupled to receive the output from said second stage and including clamping means to clamp the varying white video reference level at a substantially constant non-varying level to thereby obtain a waveform having an identifiable black information signal determined from the substantially non-varying white reference level.

5. The circuit as defined in claim 4 including means to bias the second transistor of said first stage through said detector stage.

6. The circuit as defined in claim 4 including means coupled to the output of said third stage and actuatable to remove the blanking signals from said output waveform.

7. The circuit as defined in claim 6 wherein said means is a transistor shunt gate capable of being driven to saturation in synchronism with the occurrence of the blanking signals.

References Cited by the Examiner

UNITED STATES PATENTS

| | | | |
|---|---|---|---|
| 2,949,500 | 8/1960 | Shepard | 178—7.2 |
| 3,026,370 | 3/1962 | Barnard | 178—7.2 |
| 3,040,126 | 6/1962 | Newell | 178—7.5 |

FOREIGN PATENTS

| | | |
|---|---|---|
| 1,218,764 | 5/1960 | France. |
| 1,118,820 | 12/1961 | Germany. |

DAVID G. REDINBAUGH, *Primary Examiner.*

R. MURRAY, *Examiner.*

J. McHUGH, *Assistant Examiner.*